Aug. 22, 1939.   H. E. SLOAN ET AL   2,170,769
CHUCK
Filed April 7, 1937
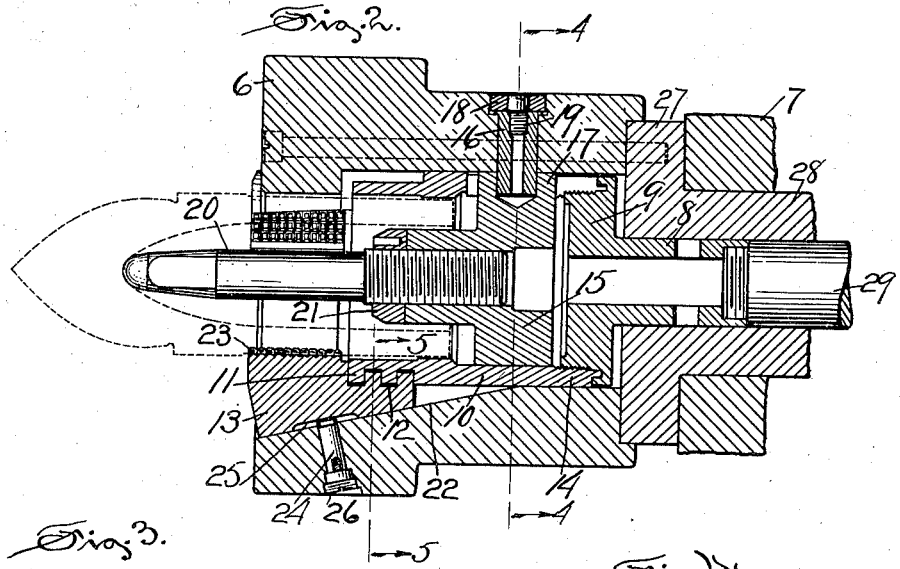
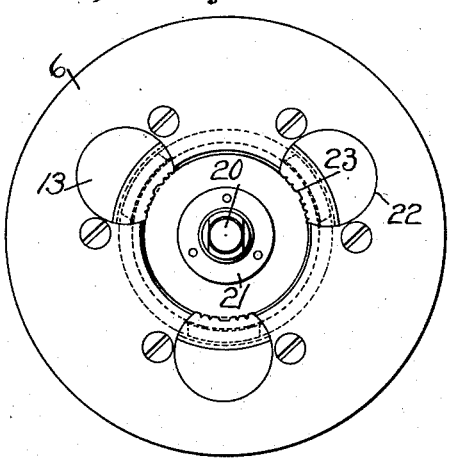
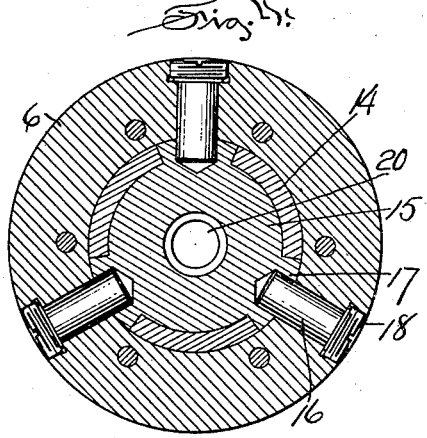
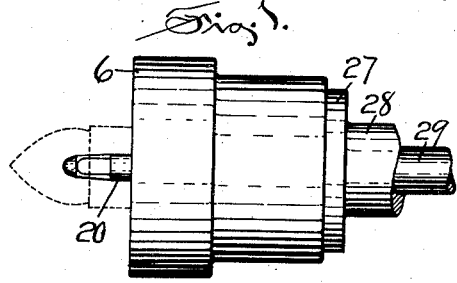
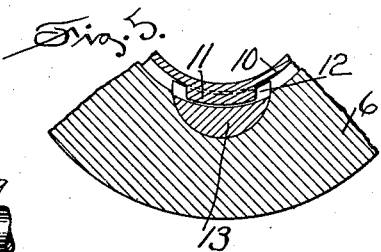
INVENTORS.
Harry E. Sloan.
George A. Highberg.
by Arthur B. Jenkins,
ATTORNEY Patented Aug. 22, 1939

2,170,769

UNITED STATES PATENT OFFICE 2,170,769

CHUCK

Harry E. Sloan, Hartford, and George A. Highberg, West Hartford, Conn., assignors to The Cushman Chuck Company, Hartford, Conn., a corporation of Connecticut Application April 7, 1937, Serial No. 135,458

2 Claims. (Cl. 279—60)

Our invention relates to the class of devices which are employed for holding articles of various sorts to be operated upon and which are rotated for operation of the tools or implements upon such articles, and an object of the invention, among others, is the provision of a chuck of this type that shall be simple in construction and particularly efficient in operation.

One form of a chuck embodying the invention and in the construction and use of which the objects herein set out, as well as others, may be attained is illustrated in the accompanying drawing in which—

Figure 1 is a view in side elevation of a chuck embodying our invention.

Figure 2 is a view on enlarged scale substantially in central lengthwise section of our improved chuck.

Figure 3 is a face view of the chuck.

Figure 4 is a view in section on a plane denoted by the dotted line 4—4 of Fig. 2.

Figure 5 is a view in section on a plane denoted by the dotted line 5—5 of Fig. 2.

In the accompanying drawing the numeral 6 denotes the body of our improved chuck which is adapted to be rotatably mounted in a frame 7 in any ordinary manner. A chuck jaw actuator is mounted in the body, this actuator comprising a stem 8 and a head 9, the stem being provided with any suitable means for attachment to a draw bar 29 movable lengthwise of the axis of the chuck body in a manner well understood by those skilled in the art. A jaw actuating sleeve 10 is secured to the head 9 as by means of interengaging screw threads, said sleeve having a plurality of sets of jaw actuating lugs 11 engaged within grooves 12 in chuck jaws 13, each of said sets of lugs preferably comprising two lugs entered into two grooves in the chuck jaws, and as shown in Fig. 2 of the drawing. The sleeve 10 at its inner end is slotted to create segments 14 which segments receive the threads for attachment to the actuator head 9, three of such segments preferably being provided.

A fixing stop support 15 is secured within the chuck body as by means of stud 16 located in openings extending through the side of the chuck body and into projections 17 laterally extended from the support 15 and into the spaces between the segments 14 of the sleeve 10, as herein shown there being three each of said segments, projections, and studs. The studs are held in place as by means of threaded bushings 18 in the mouths of the openings for the studs and by threaded pins 19 engaging threaded holes in the ends of the studs, and as shown in Fig. 2 of the drawing.

A work fixing stop 20 in the form of a bar is threaded into a threaded hole in the support 15 and projects therefrom and beyond the face of the chuck body, a lock nut 21 also being employed as an aid in holding said stop in place. The stop is made removable so that different lengths of stops may be employed for work pieces of different sizes. The arrangement shown herein is particularly for holding hollow articles, as shells, as shown in dotted outline in Fig. 2, the stop 20 being equipped to engage the bottom of the opening in the shell and thereby determine its position in the chuck.

The chuck jaws 13 are substantially round in cross section, having a concaved gripping face on one side which, however, occupies but a small portion of the round surface. While the jaws on lines extending from end to end at their lengthwise centers taper from greater thickness at the outer ends to lesser thicknesses at the opposite ends the back or surface of each jaw is of cylindrical shape. Chuck jaw recesses 22 are formed in the body, extending lengthwise therein and opening into the interior of said body. These recesses are formed to the shape of the chuck jaws in cross section, the latter nicely fitting the recesses and having a very substantial bearing therein owing to the support of the walls of the recesses for nearly the full circumference of the jaws and for their full length. The jaws readily rotate in their recesses or sockets to adjust themselves to any slight irregularities that may exist in the work piece to be held by them. These jaws are held in place as by means of retaining pins 24 extending through the chuck body and entered into grooves 25 in the jaws, as shown in Fig. 2 of the drawing. These grooves are of such width that the ends of the retaining pins 24 fit somewhat loosely therein so that the jaws may have a slight turning movement to enable self-adjustment to the work as hereinbefore mentioned and thereby be firmly seated against the work to hold it rigidly in place. The retaining pins 24 are held in place by means of retainers 26 threaded into the mouths of the openings for the pins, as shown in Fig. 2 of the drawing, threaded studs from the inner ends of the retainers being engaged in threaded openings in the ends of the pins.

It should here be mentioned that in the particular arrangement herein shown the chuck body 6 is secured to a flange 27 on a bearing 28 mounted in the frame 7, and as shown in Fig. 2 of the drawing. The draw bar 29 hereinbefore mentioned extends through the bearing and is screw threadedly engaged with the actuator stem 8 that also extends into the bearing.

In accordance with the provision of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. A chuck including a chuck body having a chamber therein, a chuck jaw actuating sleeve slidably fitting said chamber the wall of which forms a bearing for the sliding movement of said sleeve for substantially its whole length, the latter having openings therein at its inner end, a fixed stop support extending within said sleeve and having projections extending through said openings, means for securing said projections to said chuck body, means for imparting longitudinal movement to said sleeve, and chuck jaws rotatably mounted in recesses in said body and operatively connected with said sleeve.

2. A chuck including a chuck body having a chamber therein, a chuck jaw actuating sleeve slidably fitting said chamber the wall of which forms a bearing for the sliding movement of said sleeve for substantially its whole length, the latter having openings therein near its inner end, a fixed stop support extending within said sleeve and having projections extending through said openings, means for securing said projections to said chuck body, an actuating head secured within the inner end of said sleeve and closing the opening thereinto, a stem projecting from said head for attachment to a draw bar for operation of said head, and chuck jaws located in recesses in said chuck body and operatively connected with said sleeve.

HARRY E. SLOAN.
GEORGE A. HIGHBERG.